(12) United States Patent
Bergström et al.

(10) Patent No.: US 11,212,722 B2
(45) Date of Patent: Dec. 28, 2021

(54) METHOD AND ARRANGEMENT FOR REQUESTING OF RESOURCES

(71) Applicant: Telefonaktiebolaget LM Ericsson (publ), Stockholm (SE)

(72) Inventors: Andreas Bergström, Linköping (SE); Pradeepa Ramachandra, Linköping (SE); Erik Eriksson, Linköping (SE); Reza Moosavi, Linköping (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 134 days.

(21) Appl. No.: 15/745,204

(22) PCT Filed: Aug. 7, 2015

(86) PCT No.: PCT/SE2015/050860
§ 371 (c)(1),
(2) Date: Jan. 16, 2018

(87) PCT Pub. No.: WO2017/026929
PCT Pub. Date: Feb. 16, 2017

(65) Prior Publication Data
US 2019/0021032 A1 Jan. 17, 2019

(51) Int. Cl.
*H04W 36/00* (2009.01)
*H04W 72/12* (2009.01)
(Continued)

(52) U.S. Cl.
CPC ..... *H04W 36/00837* (2018.08); *H04W 36/14* (2013.01); *H04W 72/1284* (2013.01);
(Continued)

(58) Field of Classification Search
None
See application file for complete search history.

(56) References Cited

U.S. PATENT DOCUMENTS 10,355,844 B2 * 7/2019 Yang .................. H04L 5/001
2009/0238122 A1 * 9/2009 Vukovic ........ H04W 72/0493
370/329
(Continued)

FOREIGN PATENT DOCUMENTS

CN 102143522 A 8/2011
CN 104025689 A 9/2014
(Continued)

OTHER PUBLICATIONS

European Search Report for European Patent Application No. 15901099.0, dated Jul. 17, 2018, 3 pages.
(Continued)

*Primary Examiner* — Gregory B Sefcheck
*Assistant Examiner* — Suk Jin Kang
(74) *Attorney, Agent, or Firm* — Withrow & Terranova, PLLC

(57) ABSTRACT

A wireless device, a network node and methods therein are provided for achieving an improved link utilization. The method in a wireless device comprises obtaining a configuration related to a first and a second set of resources which the wireless device may use for requesting communication resources from the network. The method further comprises requesting communication resources for uplink or downlink communication using at least one resource from each set of the first and second set. The method further comprises: when a criterion related to at least one of the first and second set is fulfilled: entering a fallback scheme associated with the fulfilled criterion.

22 Claims, 8 Drawing Sheets

(51) Int. Cl.
*H04W 36/14* (2009.01)
*H04W 74/08* (2009.01)
*H04W 74/00* (2009.01)
*H04L 5/14* (2006.01)

(52) U.S. Cl.
CPC ........... *H04W 74/0833* (2013.01); *H04L 5/14* (2013.01); *H04W 74/004* (2013.01)

(56) References Cited

U.S. PATENT DOCUMENTS

| | | | | |
|---|---|---|---|---|
| 2009/0316593 | A1* | 12/2009 | Wang | H04W 74/0833 370/252 |
| 2010/0113010 | A1* | 5/2010 | Tenny | H04L 12/66 455/423 |
| 2012/0182977 | A1* | 7/2012 | Hooli | H04W 72/1278 370/336 |
| 2013/0028221 | A1* | 1/2013 | Seo | H04L 1/1861 370/329 |
| 2013/0195027 | A1* | 8/2013 | Hsu | H04W 74/006 370/329 |
| 2014/0293898 | A1* | 10/2014 | Tseng | H04W 72/04 370/329 |
| 2015/0078231 | A1 | 3/2015 | Bergström et al. | |
| 2015/0124771 | A1* | 5/2015 | Ko | H04L 1/0027 370/329 |
| 2015/0208442 | A1* | 7/2015 | Bai | H04W 74/0875 370/329 |
| 2015/0289289 | A1* | 10/2015 | Qian | H04W 72/14 370/329 |
| 2016/0044701 | A1* | 2/2016 | Zhang | H04W 28/0278 370/329 |
| 2016/0094975 | A1* | 3/2016 | Sheng | H04W 72/042 370/216 |
| 2016/0183309 | A1* | 6/2016 | Zhang | H04W 52/50 370/329 |
| 2016/0286576 | A1* | 9/2016 | Zander | H04W 4/06 |
| 2016/0345356 | A1* | 11/2016 | Lindoff | H04W 72/14 |
| 2017/0135135 | A1* | 5/2017 | Pelletier | H04L 1/0072 |
| 2017/0150512 | A1* | 5/2017 | Cao | H04W 72/1268 |
| 2017/0208483 | A1* | 7/2017 | Chmiel | H04W 72/0413 |
| 2018/0020382 | A1* | 1/2018 | Kim | H04W 36/0055 |
| 2018/0042053 | A1* | 2/2018 | Martin | H04W 28/0205 |
| 2018/0070386 | A1* | 3/2018 | Zhang | H04W 52/50 |
| 2018/0199267 | A1* | 7/2018 | Lin | H04W 48/14 |
| 2018/0227938 | A1* | 8/2018 | Lee | H04L 5/0053 |
| 2018/0234279 | A1* | 8/2018 | Dinan | H04W 56/0045 |
| 2019/0021103 | A1* | 1/2019 | Zhang | H04W 28/0278 |
| 2019/0058570 | A1* | 2/2019 | Zhang | H04L 5/0098 |
| 2019/0069326 | A1* | 2/2019 | Zhang | H04W 52/50 |
| 2019/0089507 | A1* | 3/2019 | Dinan | H04W 74/0833 |
| 2019/0246417 | A1* | 8/2019 | Dinan | H04W 72/1268 |
| 2020/0187233 | A1* | 6/2020 | Dinan | H04L 5/0053 |

FOREIGN PATENT DOCUMENTS

| | | |
|---|---|---|
| CN | 104813713 A | 7/2015 |
| CN | 103999526 B | 11/2017 |
| EP | 2661138 A1 | 11/2013 |
| WO | 2013009230 A1 | 1/2013 |
| WO | 2013023055 A1 | 2/2013 |

OTHER PUBLICATIONS

International Preliminary Report on Patentability for International Patent Application No. PCT/SE2015/050860, dated Feb. 22, 2018, 8 pages.

Author Unknown, "Technical Specification Group Radio Access Network; Evolved Universal Terrestrial Radio Access (E-UTRA); Medium Access Control (MAC) protocol specification (Release 12)," Technical Specification 36.321, Version 12.0.0, 3GPP Organizational Partners, Dec. 2013, 57 pages.

Author Unknown, "Technical Specification Group Radio Access Network; Evolved Universal Terrestrial Radio Access (E-UTRA); Radio Resource Control (RRC); Protocol Specification (Release 12)," Technical Specification 36.331, Version 12.0.0, 3GPP Organizational Partners, Dec. 2013, 349 pages.

Ericsson, et al., "R2-114157: Fallback to R99 RACH," Third Generation Partnership Project (3GPP) TSG-RAN WG2 #75, Aug. 22-26, 2011, Athens, Greece, 3 pages.

International Search Report and Written Opinion for International Patent Application No. PCT/SE2015/050860, dated Apr. 18, 2016, 11 pages.

Office Action for Chinese Patent Application No. 201580082240.3, dated Aug. 12, 2021, 20 pages.

* cited by examiner

METHOD AND ARRANGEMENT FOR REQUESTING OF RESOURCES

This application is a 35 U.S.C. § 371 national phase filing of International Application No. PCT/SE2015/050860, filed Aug. 7, 2015, the disclosure of which is incorporated herein by reference in its entirety.

TECHNICAL FIELD

The invention relates to requesting of resources in wireless communication networks.

BACKGROUND

Beamforming, dynamic TDD and self-backhauling are some examples of components often associated with discussions for a future radio access technology, sometimes referred to as "5G".

Beamforming is envisaged to provide significant link budget gains as well as to suppress interference by transmitting/receiving only in the spatial directions of interest for a given transmission. Different architectures can be envisioned for beam forming. For example, in some implementations, it may be possible to transmit or receive in many spatial directions at the same time, while in other implementations it may only be possible to transmit or receive in one, or a few, directions at the time.

In dynamic TDD, certain time-slots, which are sometimes referred to as "flexible subframes", can dynamically be assigned as uplink or downlink resources, e.g. based on current need for resources in the respective directions. Dynamic TDD is envisaged to provide significant spectral efficiency gains as compared to semi-statically dividing the time-slots due to traffic load variations between uplink and downlink. However, it is typically not possible to receive any signals in one direction, e.g. the uplink, at the same time as a different signal is transmitted in another direction, e.g. the downlink.

Self-backhauling implies that a node receiving data on a first link forwards the received data, in the same or an adjacent frequency band using the same or a similar radio access technology, on a backhaul link. In many implementations of self-backhauling it will not be possible to be actively transmitting or receiving in one link while being active on the other. This will be especially relevant for TDD systems, where the same frequency band is used for both reception and transmission on both links.

In all of the above examples, there is a possibility that usage of a first link cannot be combined with simultaneous usage of a second link, such as e.g. uplink and downlink, or backhaul link and an access link.

In state of the art systems, time slots, such as subframes, are typically divided between links of which simultaneous transmissions in the timeslots would otherwise interfere with each other, such as e.g. uplink and downlink. The division between links is performed in a semi-static fashion. This avoids ambiguity and enables all nodes to know which subframes that are available for a given link at a given time.

This prior art solution, however, has the drawback of bad link utilization as compared to assigning time-slots in a dynamic fashion to the link that requires it. Applying dynamic utilization of the time-slots, on the other hand, creates a problem in regard of resources that has to be semi-statically assigned. Examples of such resources are scheduling request (SR) resources, in which a wireless device can notify a base station of that it wants to access a channel in order to transmit data. The introduction of a more dynamic use of communication resources is associated with problems, which it is desired to solve.

SUMMARY

It is desired to achieve a high link utilization yet keeping down the latency in regard of requests for resources. Herein, a solution is provided, which enables a robust operation of e.g. scheduling request resources at all load levels, while enabling a high link utilization and a relatively low latency, at least at low load, given the level of link utilization, in regard of requests for resources.

According to a first aspect method is provided, which is to be performed by a wireless device in a communication network. The method comprises obtaining a configuration related to a first and a second set of resources which the wireless device may use for requesting communication resources from the network. The method further comprises requesting communication resources for uplink or downlink communication using at least one resource from each set of the first and second set. The method further comprises, when a criterion, related to at least one of the first and second set, for entering a fallback scheme is fulfilled: entering a fallback scheme associated with the fulfilled criterion.

According to a second aspect, a method is provided, which is to be performed by a network node in a communication network. The method comprises configuring a wireless device with a first and a second set of resources in which the wireless device may request communication resources from the network, wherein requests made in resources comprised in the second set are associated with a lower probability of being received by the network than requests made in resources comprised in the first set.

According to a third aspect, a wireless device is provided, which is operable in a communication network. The wireless device is configured to obtain a configuration related to a first and a second set of resources, which the wireless device may use for requesting communication resources from the network. The wireless device is further configured to request communication resources for uplink or downlink communication using at least one resource from each set of the first and second set. The wireless device is further configured to: when a criterion, related to at least one of the first and second set, for entering a fallback scheme is fulfilled: enter a fallback scheme associated with the fulfilled criterion.

According to a fourth aspect, a network node is provided, which is operable in a wireless communication network. The network node is configured to configure a wireless device with a first and a second set of resources in which the wireless device may request communication resources from the network, wherein requests made in resources comprised in the second set are associated with a lower probability of being received by the network than requests made in resources comprised in the first set.

According to a fifth aspect, a computer program is provided, which comprises instructions which, when executed on at least one processor, cause the at least one processor to carry out the method according to the first or second aspect.

According to a sixth aspect, a carrier is provided, which contains a computer program according to the fifth aspect, wherein the carrier is one of an electronic signal, optical signal, radio signal, or computer readable storage medium.

BRIEF DESCRIPTION OF DRAWINGS

The foregoing and other objects, features, and advantages of the technology disclosed herein will be apparent from the following more particular description of embodiments as illustrated in the accompanying drawings. The drawings are not necessarily to scale, emphasis instead being placed upon illustrating the principles of the technology disclosed herein.

DETAILED DESCRIPTION

Figure 1:
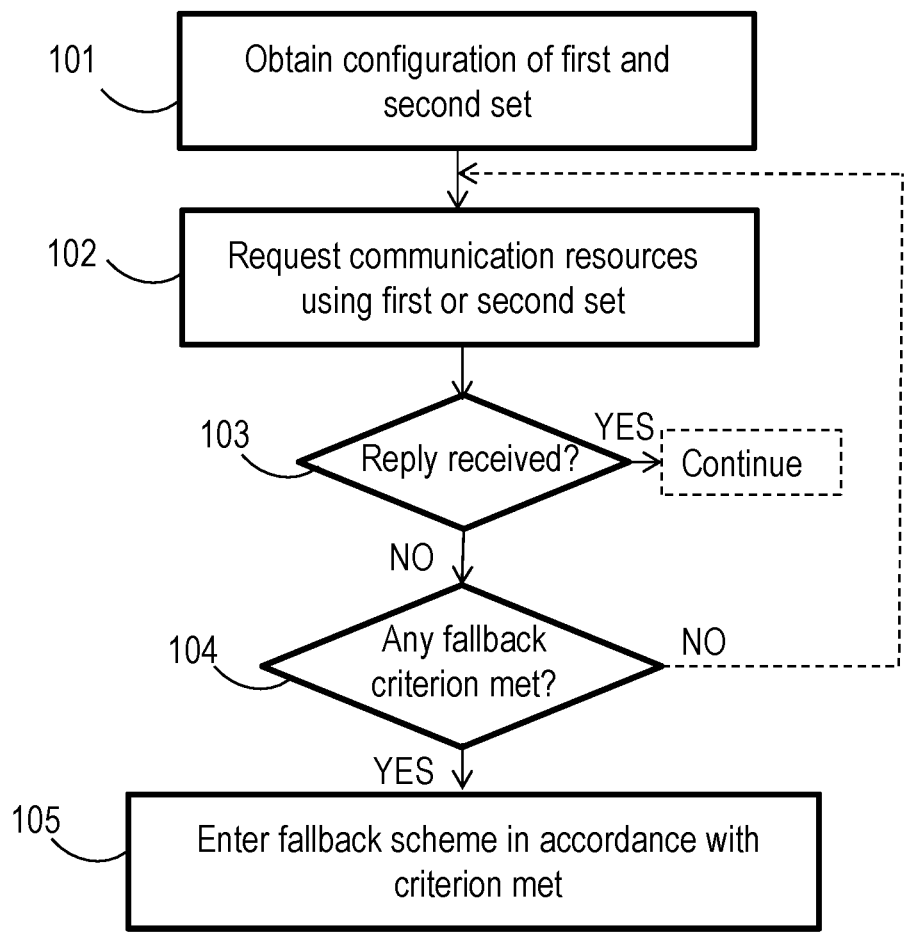
FIGS. 1-4 are flowcharts illustrating exemplifying methods performed by a wireless device according to different embodiments.

In future wireless communication networks, a more flexible utilization of resources is foreseen, as described above. This will imply many benefits, such as improved link utilization, but will also lead to problems e.g. in regard of resources which need to be provided or accessible to a wireless device in a semi-static manner, such as resources which are to be used by a wireless device for requesting communication resources.

The reason for that such resources have to be given in a semi-static manner is that it is not known in advance by the network when a wireless device will need to send a request for communication resources e.g. for transmitting data in the uplink. Since it is not known in advance when they will be needed, the network cannot assign uplink resources for transmission of requests in a dynamic need-based manner.

However, in order to achieve an efficient link utilization, it is desired to assign as few resources as possible in a semi-static manner, i.e. limiting the use of the resources e.g. to uplink requests for resources (instead of allowing dynamic use of the resources e.g. for uplink and downlink communication). Semi-static resources may be assigned or provided either by configuring common contention based resources, such as a random access channel, PRACH, or, by assigning dedicated resources for scheduling requests. One possibility to achieve an efficient link utilization, despite the use of semi-statically assigned resources, is thus to provide such dedicated resources only in very few time-slots, while using the remaining resources in a dynamic manner. The fewer dedicated resources, the better link utilization. However, the fewer dedicated resources, the longer a wireless device has to wait until it may send a request for communication resources. In other words, there is a trade-off between the time a wireless device will need to wait for an occasion to request communication resources, and the fraction of resources that need to be reserved for such requests.

The inventors have realized this problem and further realized that there is a way to improve the conditions of the trade-off. In other words, the solution described herein relates to achieving an improved link utilization, while keeping the expected time a wireless device will need to wait for an occasion to request communication resources as low as possible, or at least at a reasonable level.

One component in the solution disclosed herein is a configuration of two types of resources in which wireless devices may request communication resources from a network. A first type of resources will be dedicated resources, in which the network will listen for requests. The other, second type of resources will be resources, in which the network might listen for requests, if not being occupied with tasks preventing it from listening. The two types of resources are associated with a different probability for reaching the network with a request for communication resources.

When not receiving a reply from the network to a request for resources sent in a resource dedicated for such requests, this will be an indication of a radio related problem, e.g. that something is wrong with the radio link to the network. When not having received a reply to repeated requests in dedicated resources, a fallback strategy or scheme should be entered, such as increasing transmit power, sending a random access request or searching for, selecting or attaching to another radio access node. However, when not receiving a reply to requests sent in the second type of resources, this should not be interpreted in the same way as for the first type of resources. Thus, as realized by the inventors, the rules or criteria for when to enter a fallback scheme should take the use of different types of resources into account. For example, there could be different criteria for when to enter a fallback scheme for the different types of resources. Further, there may be different fallback schemes associated with different criteria, which will be described in more detail further below.

Below, exemplifying embodiments will be described with reference to figures. FIG. 1 illustrates a generalized embodiment of the solution described herein. The method is to be performed by a wireless device in a communication network. The method illustrated in FIG. 1 comprises obtaining 101 a configuration related to a first and a second set of resources, which (resources) the wireless device may use for requesting communication resources from the network. The method further comprises requesting 102 communication resources for uplink or downlink communication using at least one resource from each set of the first and second set. The method further comprises: when a criterion related to at least one of the first and second set, for entering a fallback scheme is fulfilled or met 104: entering 105 a fallback scheme associated with the fulfilled criterion.

By "resources" or "communication resources" is meant one or more of time, frequency and code resources. An illustrative example of a resource is a time slot, such as a resource element or resource block in LTE. Examples of requests for communication resources are scheduling requests and random access requests, or any other type of request for resources for which a reply is expected from the network. A scheduling request or other request may also comprise data.

The first and second sets of resources are different in that requests made in resources comprised in the second set are associated with a lower probability of being received by the network than requests made in resources comprised in the first set. The wireless device need not necessarily be aware of this fact. The wireless may e.g. be configured to act according to a set of rules, which are based on that the probability of requests being received by the network is different for the two sets.

The first set may alternatively be referred to as a "dedicated", "fixed" or "hard" set, and the resources comprised in the first set may also be referred to as dedicated, fixed or hard, or as being associated with a dedicated, fixed or hard time-slot or subframe. The second set may alternatively be referred to as a "non-dedicated", "flexible" or "soft" set, and the resources comprised in the second set may be referred to as non-dedicated, flexible or soft or as being associated with a non-dedicated, flexible or soft time-slot or subframe. The use of more than two sets is also possible, even though the description herein focuses on a case with two sets. For example, each set may correspond to resources in an interval related to how probable it is that a base station will be able to receive a SR transmitted in the resources. All resources available for transmission of requests for communication resources could then be categorized into such intervals or segments, and then the number of sets would depend on the division into intervals.

The obtaining of a configuration may comprise receiving information indicating or defining the two sets of resources. Such information may further comprise one or more rules or criteria for when and/or how to use the different sets for requesting resources, and may further or alternatively comprise one or more rules or criteria related to the two sets for when to enter a fallback scheme. Examples of such criteria will be given further below. The first set of resources may comprise resources in which the network, e.g. a serving network node, is configured to listen for requests from the wireless device. The second set of resources may be resources in which the network may be doing other things than listening for requests, such as transmitting in the downlink, communicating in beams in other directions than towards the wireless device, or self-backhauling, i.e. communicating on the backhaul link. However, when not being occupied with other things, the network may listen for requests also in the second set of resources. This possibility improves the chances for a wireless device to obtain communication resources, as compared to when only sending requests in resources from one set of e.g. dedicated resources. Further, the solution described herein enables keeping the latency for requesting communication resources down without triggering inadequate fallback actions.

A wireless device may use resources from the first and/or second set of resources for requesting communication resources from the network. It may be assumed that the wireless device uses resources from both sets for sending requests, either interchangeably, or according to a scheme. For example, the wireless device could be configured to use the first available resource from either set for sending a first request or a repeated request. Further, as an example, resources from the second set could be used until a resource from the first set is available, after which only resources from the first set are used until a reply is received or a fallback scheme is triggered. By available is here not meant to indicate that the resource is "free", but that it occurs. The method in FIG. 1 is described as comprising that the wireless device request communication resources for uplink or downlink communication using at least one resource from each set of the first and second set. This is intended to reflect that the wireless device uses resources from both sets, but not necessarily for each request. For example, when a first request is successful, only resources from one of the sets will have been used, e.g. the resource which was available first. When a request is repeated, resources from the other set may be used. Examples of this will be given further below.

A fallback scheme should be entered when a request for communication resources has "failed" in some aspect. "Fail" in this case may imply that no reply or response is received to a request, which possibly has been repeated a number of times. In other words, the wireless device has not obtained any confirmation of that the network has received the request, e.g. in form of a grant for resources. In FIG. 1, this is illustrated as an action 103, where it is determined whether a response to the request has been received or not. The wireless device could be configured with a plurality of different criteria for entering a fallback scheme, and a fallback scheme could be entered when at least one of the criteria is fulfilled (or met). In other words, the criterion for entering a fallback scheme determined to be fulfilled or met in action 104 may be a criterion out of a set of criteria related to the first and/or second set of resources.

A criterion for entering a fallback scheme could be configured in in different ways. For example, such a criterion could relate to a number of allowed unsuccessful attempts to request communication resources using resources comprised in one of the sets. A number of allowed unsuccessful attempts for the first set of resources could then be lower than a number of allowed unsuccessful attempts for the second set of resources. Alternatively, a criterion could relate to a combination of a number of allowed unsuccessful attempts to request communication resources using (resources comprised in) the first set and a number of allowed unsuccessful attempts to request communication resources using (resources comprised in) the second set. Alternatively, such a criterion may be constructed as a maximum allowed time period from the first unsuccessful attempt to request communication resources using (resources comprised in) one of the sets.

When having a plurality of criteria for when to enter a fallback scheme, at least two criteria from the set or plurality of criteria may be associated with different fallback schemes. For example, when a criterion related to the first set of resources is met, a first fallback scheme could be entered, and when a criterion related to the second set of resources is met, a second fallback scheme could be entered. An example of such a first fallback scheme (associated with the first set of resources) could be to attempt to attach to another radio access node. An example of a second fallback scheme associated with the second set of resources could be to only use resources from the first set for repeating the request, or to enter a random access procedure towards the radio access node currently serving the wireless device. However, the different criteria may also be associated with the same fallback scheme, which then will be entered when one of the criteria is met (fulfilled).

Fallback from Dedicated Scheduling Request to Random Access Based Scheduling Request According to an exemplifying embodiment, a wireless device is configured with a set of request occasions, which will be referred to as Scheduling Request, SR, occasions below, and a request will be referred to as an "SR", even though other types of requests are also possible. The configuration may for example be given as one or more periodic SR resources. The wireless device identifies a subset of the SR occasions as belonging to a first set and the remaining other SR resources (other than first set) as belonging to a second set. The first set has a higher likelihood of the base station receiving or attempting to receive a SR transmitted in the resources comprised in the set, as compared to the second set. The mapping to sets may for example be signaled from a serving base station, or be signaled form another source, which may be fixed in the standard or be derived by the wireless device, e.g. based on radio measurements.

The wireless device in the exemplifying embodiment also has a fallback procedure associated with transmission of SRs. In this embodiment, the fallback procedure may be that; if a failure of the SR is detected, the wireless device should attempt to send a request for resources (SR) using a random access procedure. According to the solution described herein, separate rules can be applied on what SR occasion to use and how to perform the fallback.

In some embodiments, the wireless device will attempt to use the next available SR occasion independent of type. In some embodiments, the wireless device will use the next available occasion until the first time a SR is sent on a "fixed" occasion, after which only "fixed" occasions are used. This may be understood as that the fixed occasions are the "good ones", but until a fixed occasion is available, the wireless device will try with flexible occasions, which still have some probability of success.

Figure 2:
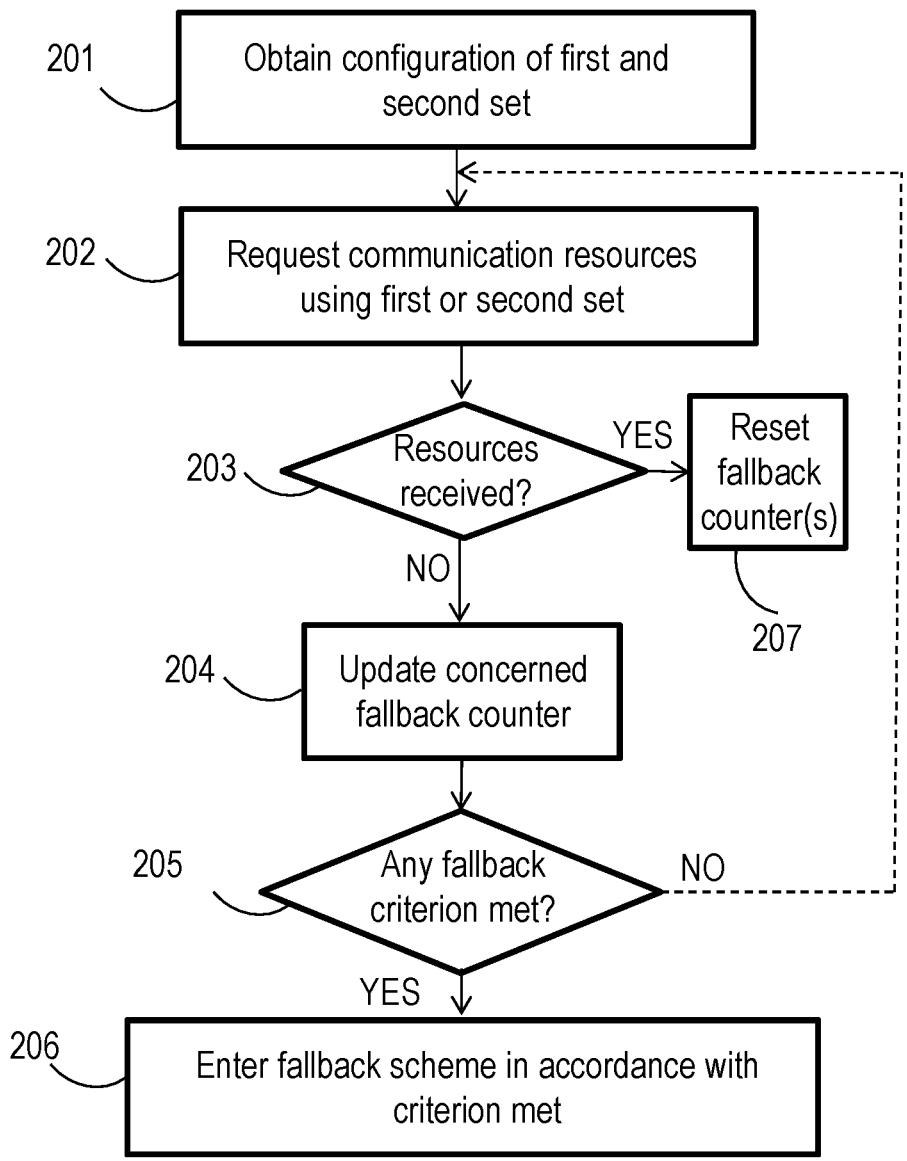

A rule for when to fall back, e.g. to a random access based SR, may be based on the number of attempts made to send an SR, e.g. in a certain set of resources. For example, the number of SRs sent in in the first and/or second set of occasions (or resources) may be counted, e.g. by means of a counter, which is increased for each attempt made. Such an embodiment is illustrated in FIG. 2. In FIG. 2, a counter for attempts to request resources is configured for the respective sets of resources. That is, each time a request transmitted in resources from one of the sets is unsuccessful, e.g. when no answer is received, the counter associated with the set in question is updated 204, e.g. increased by one. Then, the status of the counters is evaluated 205 based on a set of criteria for fallback. When a criterion is met, a fallback scheme is entered 206. When a request is successful, the counters may be reset 207. In cases were the fallback criteria are directed e.g. only to one of the sets, it would also be possible to count only the attempts made in resources from the set in question, e.g. the first set, which is illustrated in FIG. 4.

Figure 4:
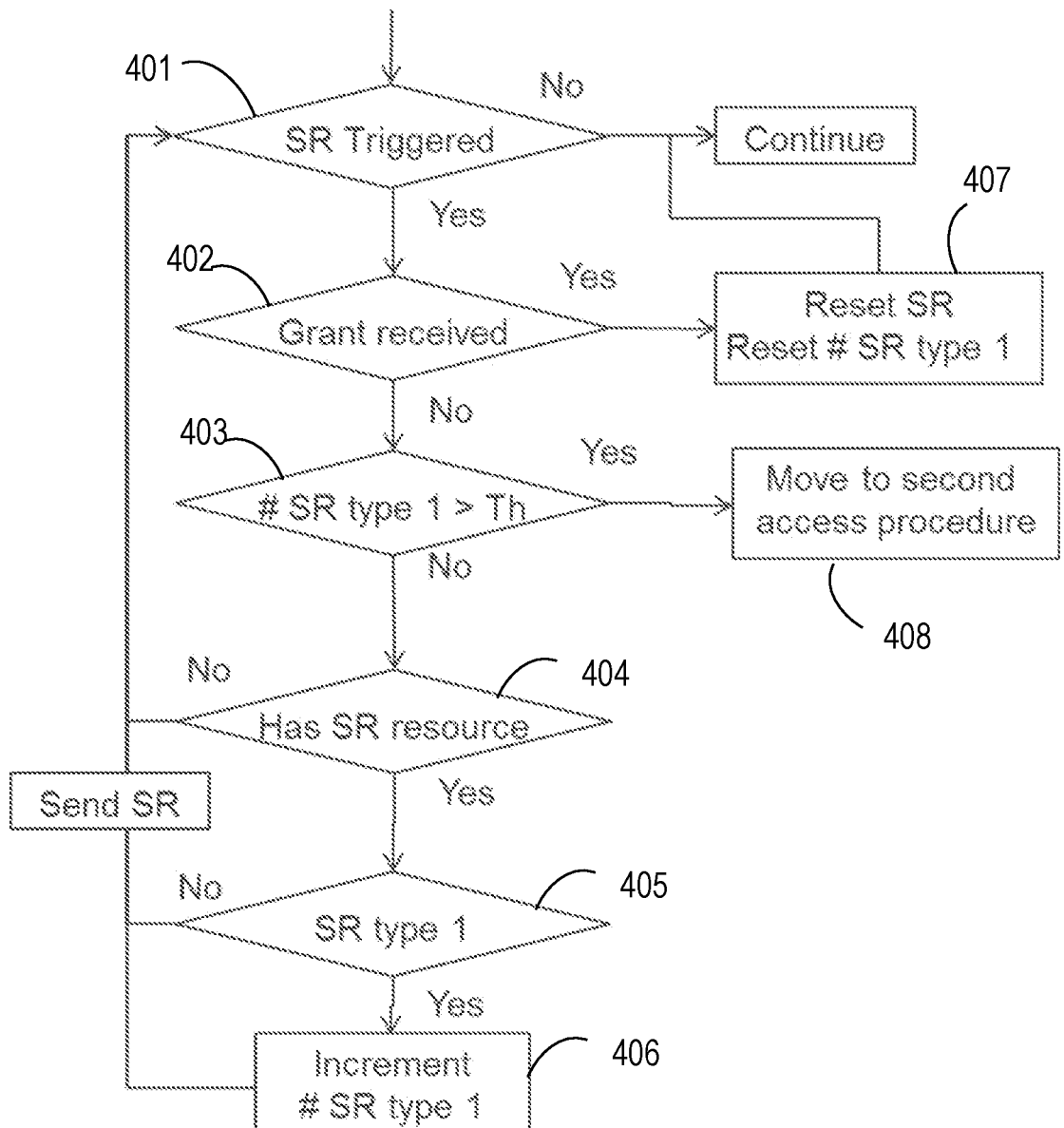

FIG. 4 illustrates an exemplifying method embodiment where, when a request is triggered 401, no grant is received 402 and the number of requests, i.e. including first request and possible repeated requests, of a first type, i.e. made in a first set of resources, does not exceed a threshold 403, a repeated request (or first when #SR type 1 is zero) may be sent 405 using the first type of resources, when such a resource is available/occurs 404. When a request has been transmitted 405 using the first type of resources, a counter is incremented. The counter may be reset 407, e.g. set to zero, when a grant is received. When the number of attempts to request resources using the first set of request resources exceeds 403 the threshold, a fallback scheme may be entered 408, such as attempting another access procedure e.g. random access.

Figure 3:
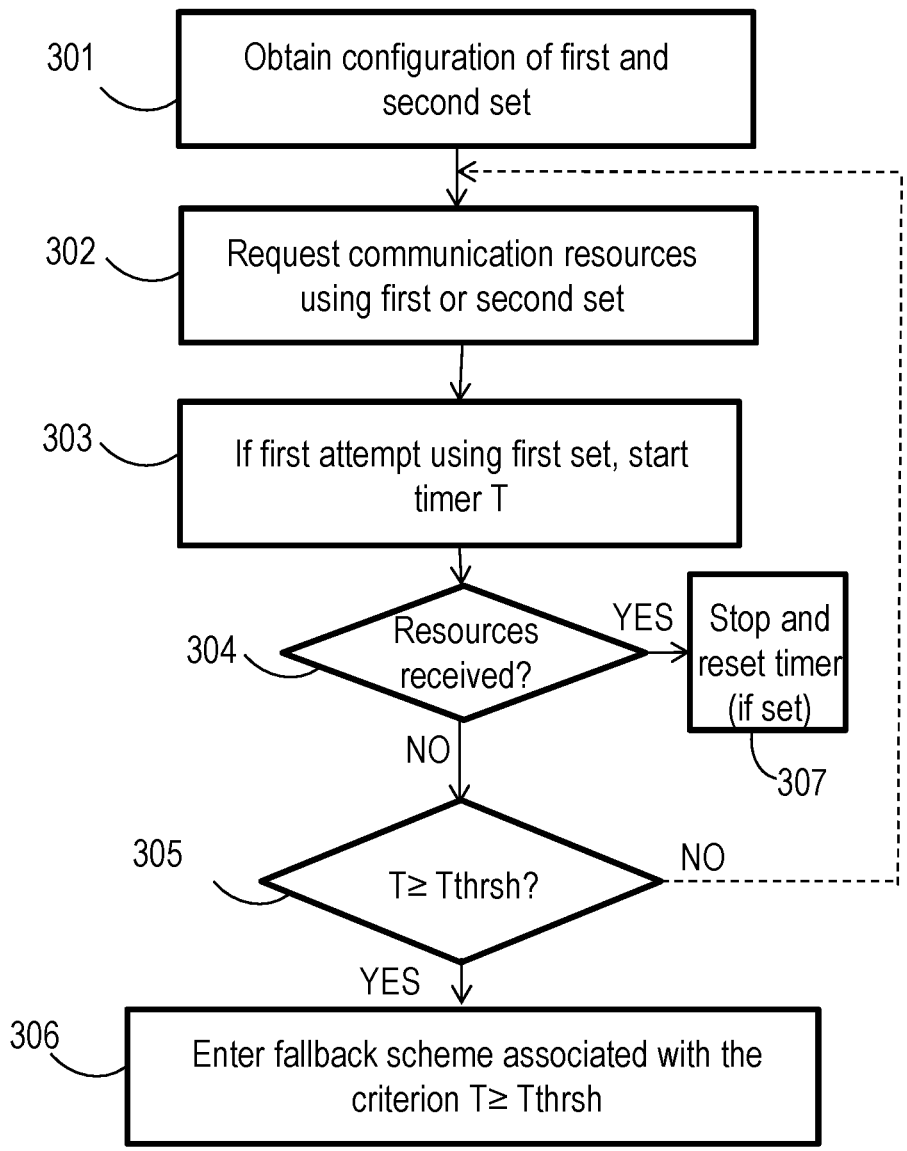

Alternatively or in addition, a rule for when to enter or trigger a fallback procedure may be based on a timer, e.g. from when the first SR in the first set of occasions is transmitted. Such an embodiment is illustrated in FIG. 3. In FIG. 3, when a request is made 302, and the request is the first attempt using the first set of resources, a timer is started 303. That is, the request may be a repeated request, where one or more previous attempts have been made using resources from the second set. Then, the timer (criterion) is evaluated 305 for each failing attempt to request the resources. When it is concluded that a threshold, e.g. $T_{thrsh}$, is met, a fallback scheme is entered 306. When an attempt to request the resources is successful, the timer may be stopped and/or reset 307 (when having been previously started or set).

Alternatively or in addition, also other rules can be considered e.g. that a fallback should be triggered after $N_1$ attempts using set 1 or $N_2$ attempts using set 2, or if $N_1*\alpha+N_2*\beta>X$, where X is a threshold value and alpha and beta scaling parameters.

Selection of Resources

As previously described, different rules can be applied for the usage of SR resources from "fixed" time slots, than for the usage of SR resources from "flexible" time-slots.

In one exemplifying embodiment, a wireless device is configured to use the next available resource irrespective of in which set it is comprised. In other embodiments "flexible" occasions are only used until the first "fixed" occasion. Alternatively, a certain number of "flexible" occasions are to be used for the first attempts to request resources, and if those attempts do not succeed, the wireless device may instead use a number of "fixed" occasions.

For example, different rules for how to utilize "fixed" and "flexible" occasions can be applied for different traffic types. For example, a wireless device may be allowed to use both fixed and flexible occasions for sending requests for communication resources intended for latency sensitive data, while requests related to data with less stringent time requirements may be sent only in flexible occasions.

In current wireless communication systems, such as LTE, there is a possibility to configure a back-off time in order not to use an SR resource which is too close to a previous SR transmission. The purpose of this is to avoid creating unnecessary interference by transmitting a lot of requests while waiting for the serving network node to respond to the sent SR. In some embodiments of the solution described herein, a similar timing may be applied, but separately for "fixed" and "flexible" occasions, potentially having different back-off configurations.

Further, separate power control can be applied for the two occasion or resource types. For example, an SR transmission in a "flexible" occasion may be associated with a higher risk to cause interference to a simultaneous transmission, e.g. on a back-haul link or in the downlink in case of dynamic TDD, than an SR transmission in a fixed occasion. Therefore, a lower transmit power, or received power target, may be used for transmissions of requests in flexible occasions than for transmissions in fixed occasions. In other scenarios or embodiments, an intended receiver of a request may potentially receive a request in a flexible occasion even if using a less suitable beamforming setting, if it is just strong enough. In such embodiments, a higher transmit power may be used for transmissions in the flexible occasions, as compared to transmissions in fixed occasions.

Fallback from Random Access

The solution described herein is applicable for the type of requests, which in existing systems typically are made in a dedicated scheduling request resource, such as in a control channel as the physical uplink control channel, PUCCH, in LTE. However, the solution described herein is also applicable for random access, which in existing systems typically is requested in a common resource denoted e.g. random access channel, RACH. The solution is applicable both for random access based SR from connected mode, and for random access connection setup requests from idle mode.

In embodiments related to random access, the sets of resources would comprise random access occasions, in which e.g. a randomly selected preamble can be sent. In regard of rules for when to enter a fallback scheme from random access procedure, also here restrictions may be put on the number of random access attempts that can be made before the wireless device needs to fall back. The fallback may comprise to "back off" in terms of waiting for a certain time period before attempting to perform random access again, or, the fallback may comprise finding a new cell or network node to access, e.g. on a different frequency.

Embodiments herein further relate to a method performed by the communication network, e.g. by a network node operating in the network. For example, such a network node could be a radio access node, such as high power base station, a low power base station, eNB or an Indoor Radio Unit, IRU, or a core network node, such as a management or control node. The method could alternatively be performed in a distributed manner, i.e. where different actions could be performed in different locations in the network, e.g. in a so-called cloud solution, or, a "Centralized RAN" or "Split Architecture", where e.g. a radio access node such as an eNB is divided into 2 or more separate nodes. Correspondingly, the method could be performed e.g. partly in a radio access node and partly in a core network node. The distributed case could be described as that the method is performed by a network node, but the network node could be distributed in the network, and not necessarily be comprised in one physical unit e.g. close to an antenna.

Figure 5:
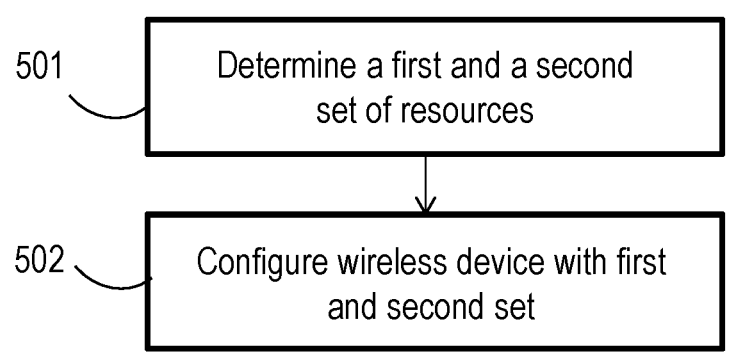
FIG. 5 is a flowchart illustrating a method performed in a wireless communication network by a network node or an arrangement, according to an exemplifying embodiment.

A generic embodiment of a method according to the solution presented herein is illustrated in FIG. 5. The method illustrated in FIG. 5 comprises configuring 502 a wireless device with a first and a second set of resources in which (resources) the wireless device may request communication resources from the network. Requests made in resources comprised in the second set are associated with a lower probability of being received by the network than requests made in resources comprised in the first set. The configuring may comprise sending, initiating sending of or triggering transmission of, information to the wireless device, which information indicates or defines the two sets of resources. Such information may further comprise one or more rules or criteria for when and/or how the wireless device should use the different sets for requesting resources, and may further or alternatively comprise one or more rules or criteria related to the two sets for when the wireless device should enter a fallback scheme, as described above. For further details about the sets of resources is referred to the description of the method performed by a wireless device above. As previously described, the network, e.g. the network node, is configured to listen for requests in the first set of resources, while in the second set of resources, the network may listen for requests, but may alternatively be doing other things, such as transmitting in the downlink, communicating in beams in other directions than towards a wireless device sending requests, or self-backhauling, i.e. communicating on the backhaul link.

The method illustrated in FIG. 5 may further comprise determining 501, which resources out of a number of possible resources, alternatively denoted e.g. candidate resources, that are to be comprised in the respective first and second set of resources.

A network node may determine to which type or set a resource or occasion belongs, based e.g. on information obtained from monitoring of resources, and/or obtained from other network nodes, such as a management node or a base station serving as a backhaul receiver to the network node. Such information may be related to which radio resources that are configured as flexible in dynamic TDD, i.e. which resources that may be dynamically assigned either to uplink or downlink communication. Alternatively or in addition, such information may indicate when transmissions in either direction on the backhaul link may occur. Further, the determining 501 may be based on knowledge or information about how much of a coverable spatial area that may or will be covered by radio beams during a time period The network node may further determine to which set or type an occasion or resource belongs based on historic measurements or events. Such events could be e.g. time-slots in which other served users are scheduled, or time slots in which a self-backhauled base station is scheduled in the backhaul link. In some embodiments the determining may be based on experienced interference. For example, resources associated with a high interference (e.g. exceeding a threshold) could be determined as belonging to the second or flexible set, while resources associated with a lower interference may be determined as belonging to the first or fixed set. In some embodiments the interference is not measured by the network node, but the network node is instead informed about the risk of high interference in certain resources based on the configurations used in neighbor nodes. For example, if a neighbor node may use some (e.g. dynamic TDD) resources for downlink, there is an increased risk for that interference may be experienced in those resources, as compared to resources which are dedicated for uplink communication of the neighbor.

Exemplifying Implementations:

The methods and techniques described above may be implemented in wireless devices and in a wireless communication network, e.g. in one or more network nodes, such as e.g. radio access nodes and/or core network nodes. The methods could be implemented in a distributed manner, e.g. a plurality of nodes or entities could each perform a part of the actions e.g. at different locations in the network. For example, one or more embodiments could be implemented in a so-called cloud solution, or a "Centralized RAN" or "Split Architecture", where e.g. an eNodeB is divided into 2 or more separate nodes. Correspondingly, the network could be configured such that actions of the method embodiments are performed e.g. partly in a radio access node and partly in a core network node. The distributed case could be referred to or described as that the method is performed by an arrangement or a network node operable in the communication network, but that the arrangement or the network node could be distributed in the network, and not necessarily be comprised in a physical unit e.g. close to an antenna. Examples of distributed and non-distributed implementations will be given further below, with reference to FIGS. 8 and 9.

Figure 6A:
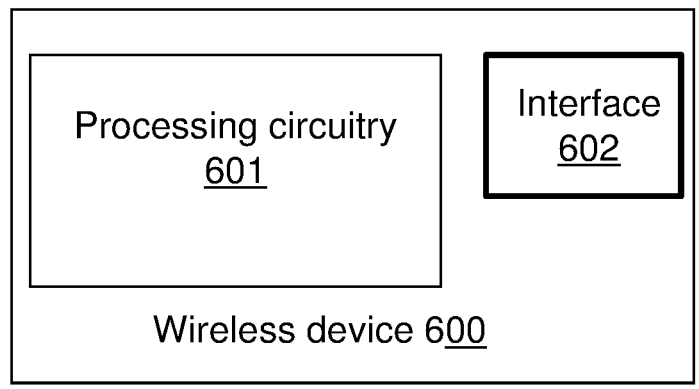
FIGS. 6a-6c are schematic block diagrams illustrating different implementations of a wireless device, according to exemplifying embodiments.
Figure 6B:
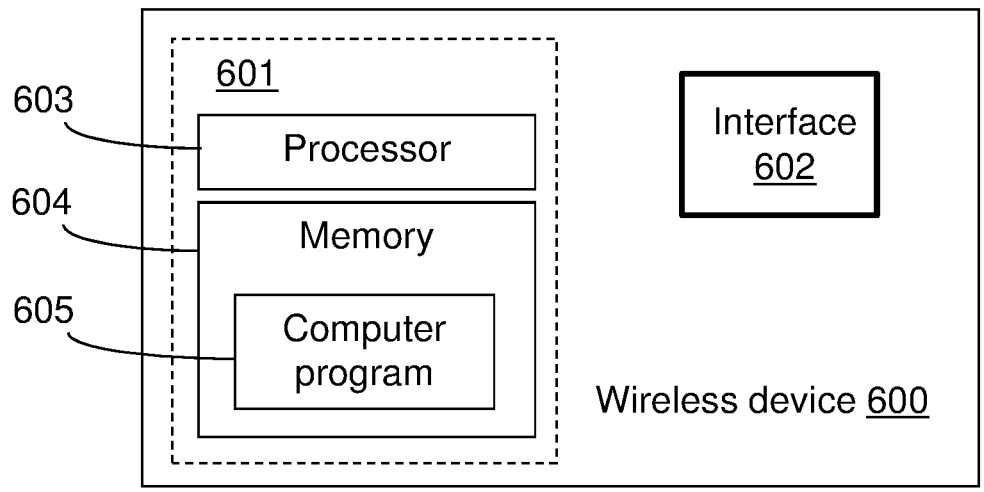
Figure 6C:
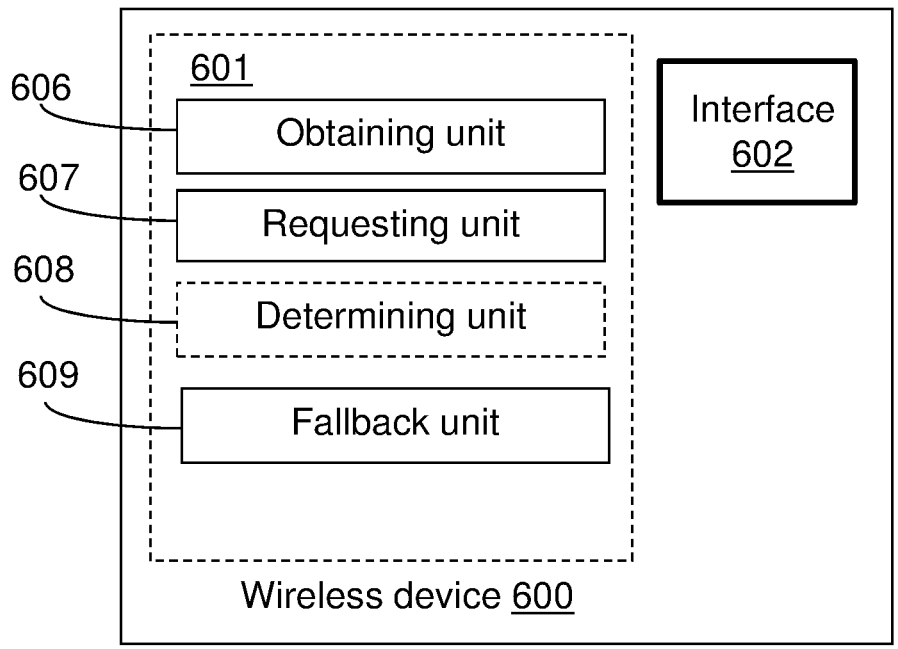

Wireless Device, FIGS. 6a-6c

An exemplifying embodiment of a wireless device is illustrated in a general manner in FIG. 6a. The wireless device may be assumed to be operable in a wireless communication network. The wireless device 600 is configured to perform at least one of the method embodiments described above with reference to any of FIGS. 1-4. The wireless device 600 is associated with the same technical features, objects and advantages as the previously described method embodiments. The wireless device will be described in brief in order to avoid unnecessary repetition. The wireless device, which may alternatively be denoted e.g. a communication device, may be e.g. a user equipment (UE) in the form of a mobile phone, video camera, sound recorder, a tablet, a laptop or any other device capable of wireless communication which may need to request resources from a wireless communication network. The wireless device may also be adapted to be positioned in, i.e. being embedded in, a vessel, such as a ship, flying drone, airplane and a road vehicle, such as a car, bus or lorry. Such an embedded device would typically belong to a vehicle telematics unit or vehicle infotainment system.

The wireless device may be implemented and/or described as follows:

The wireless device 600 comprises processing circuitry 601 and a communication interface 602. The processing circuitry 601 is configured to cause the wireless device 600 to obtain a configuration related to a first and a second set of resources, which the wireless device may use for requesting communication resources from the wireless communication network. The processing circuitry 601 is further configured to cause the wireless device to request communication resources for uplink or downlink communication using at least one resource from each set of the first and second set; and further; when a criterion, related to at least one of the first and second set, for entering a fallback scheme is fulfilled, to cause the wireless device to enter a fallback scheme associated with the fulfilled criterion. The communication interface 602, which may also be denoted e.g. Input/Output (I/O) interface, includes a network interface for sending data to and receiving data from e.g. radio access nodes.

The processing circuitry 601 could, as illustrated in FIG. 6b, comprise processing means, such as a processor 603, e.g. a CPU, and a memory 604 for storing or holding instructions. The memory would then comprise instructions, e.g. in form of a computer program 605, which when executed by the processing means 603 causes the wireless device 600 to perform the actions described above.

An alternative implementation of the processing circuitry 601 is shown in FIG. 6c. The processing circuitry here comprises an obtaining unit 606, configured to cause the wireless device to obtain a configuration related to a first and a second set of resources, which the wireless device may use for requesting communication resources from the wireless communication network. The processing circuitry further comprises a requesting unit 607, configured to cause the wireless device to request communication resources for uplink or downlink communication using at least one resource from each set of the first and second set. The processing circuitry further comprises a fallback unit 609 configured to cause the wireless device to enter a fallback scheme when a criterion for entering a fallback scheme is fulfilled, wherein the fulfilled criterion is related to at least one of the first and second set. The processing circuitry could comprise more units, such as e.g. a determining unit 608 for determining e.g. whether a criterion is fulfilled. This task could alternatively be assumed to be performed by one of the other units, e.g. the fallback unit 609, and therefore unit 608 is illustrated with a dashed outline.

The wireless devices described above could be configured for the different method embodiments described herein, e.g. in regard of the criteria and different types of traffic. The wireless device 600 may be assumed to comprise further functionality, for carrying out regular wireless device functions.

Figure 7A:
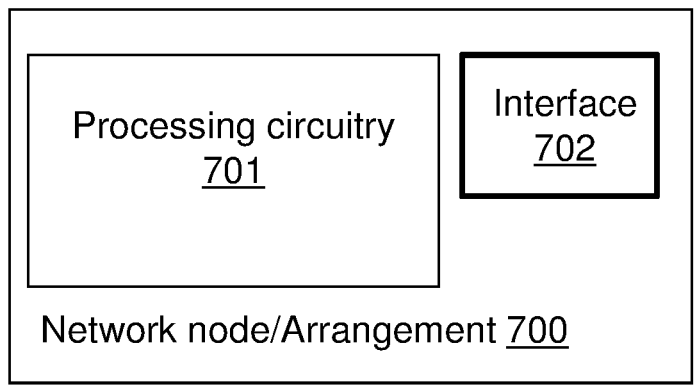
FIGS. 7a-7c are schematic block diagrams illustrating different implementations of a network node or an arrangement, according to exemplifying embodiments.
Figure 7B:
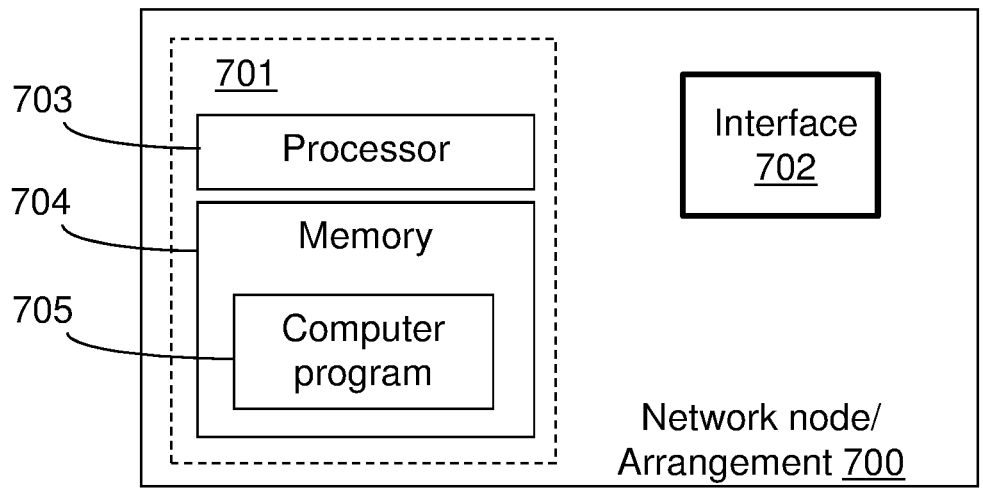
Figure 7C:
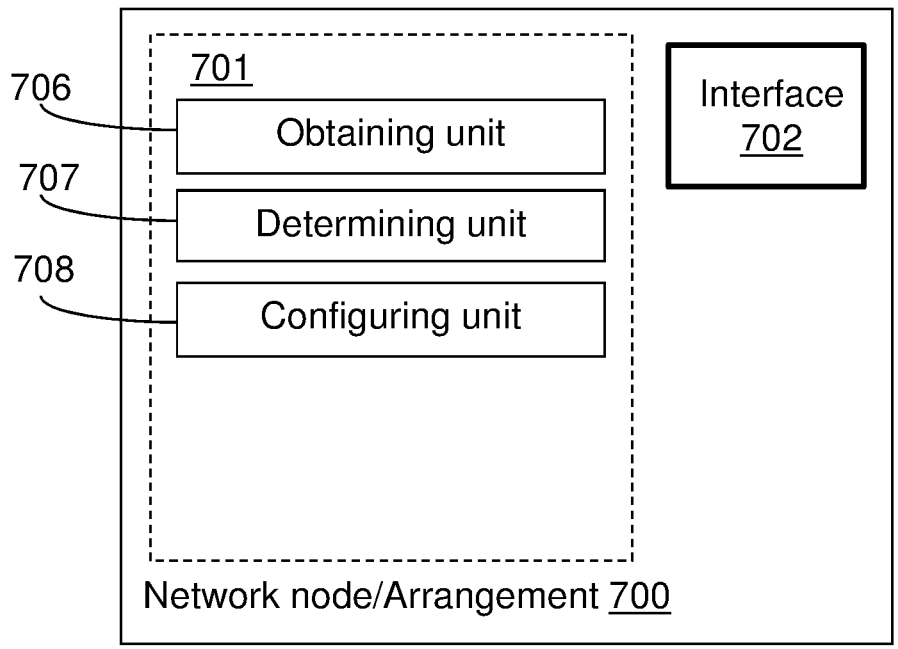

Network Node or Arrangement, FIGS. 7a-7c

An exemplifying embodiment of a network node, or an arrangement, operable in a wireless communication network is illustrated in a general manner in FIG. 7a. The network node may, as previously described, e.g. together with one or more other network nodes and/or resources or entities, represent the wireless communication network when communicating with wireless devices. The network node or arrangement 700 is configured to perform at least one of the method embodiments described above with reference to FIG. 5. The network node or arrangement 700 is associated with the same technical features, objects and advantages as the previously described method embodiments. The network node or arrangement 700 will be described in brief in order to avoid unnecessary repetition.

The network node or arrangement may be implemented and/or described as follows: The network node or arrangement 700 comprises processing circuitry 701, and one or more communication interfaces 702. The processing circuitry may be composed of one or more parts which may be comprised in one or more nodes in the communication network, but is here illustrated as one entity.

The processing circuitry 701 is configured to cause the network node or arrangement 700 to configure a wireless device with a first and a second set of resources in which the wireless device may request communication resources from the network, wherein requests made in resources comprised in the second set are associated with a lower probability of being received by the network than requests made in resources comprised in the first set. The processing circuitry 701 may further be configured to cause the network node or arrangement to determine which resources out of a number of candidate resources that are to be comprised in the respective first and second set of resources. The one or more communication interfaces 702, which may also be denoted e.g. Input/Output (I/O) interfaces, include a network interface for sending data between nodes or entities in the communication network.

The processing circuitry 701 could, as illustrated in FIG. 7b, comprise one or more processing means, such as a processor 703, and a memory 704 for storing or holding instructions. The memory would then comprise instructions, e.g. in form of a computer program 705, which when executed by the one or more processing means 703 causes the network node or arrangement 700 to perform the actions described above. The processing circuitry 701 may, as previously mentioned be composed of one or more parts and be comprised in, or distributed over, one or more nodes in the communication network as illustrated in FIGS. 8 and 9, but is here illustrated as one entity.

An alternative implementation of the processing circuitry 701 is shown in FIG. 7c. The processing circuitry here comprises a configuration unit 706, configured to cause the network node or arrangement to configure a wireless device with a first and a second set of resources in which the wireless device may request communication resources from the network, wherein requests made in resources comprised in the second set are associated with a lower probability of being received by the network than requests made in resources comprised in the first set. The processing circuitry could further comprise a determining unit 707, configured to cause the network node or arrangement to determine which resources out of a number of candidate resources that are to be comprised in the respective first and second set of resources; and may further comprise an obtaining unit 706 for obtaining information based on which the different sets may be determined. The processing circuitry could comprise more units, and may, as previously mentioned be comprised in, or distributed over, one or more nodes or entities in the communication network, but is here illustrated as comprised in one entity.

The network nodes and arrangements described above could be configured for the different method embodiments described herein, e.g. in regard of how the different sets are determined and/or indicated to the wireless device.

Figure 8:
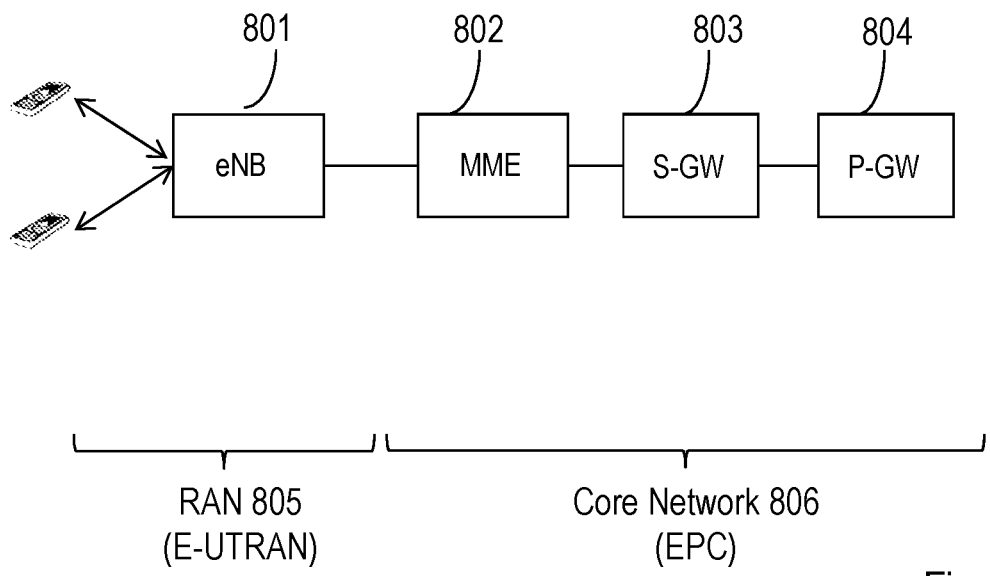
FIGS. 8-9 are schematic block diagrams illustrating different implementations of a wireless communication network, in which embodiments may be applied in a distributed or non-distributed manner.
Figure 9:
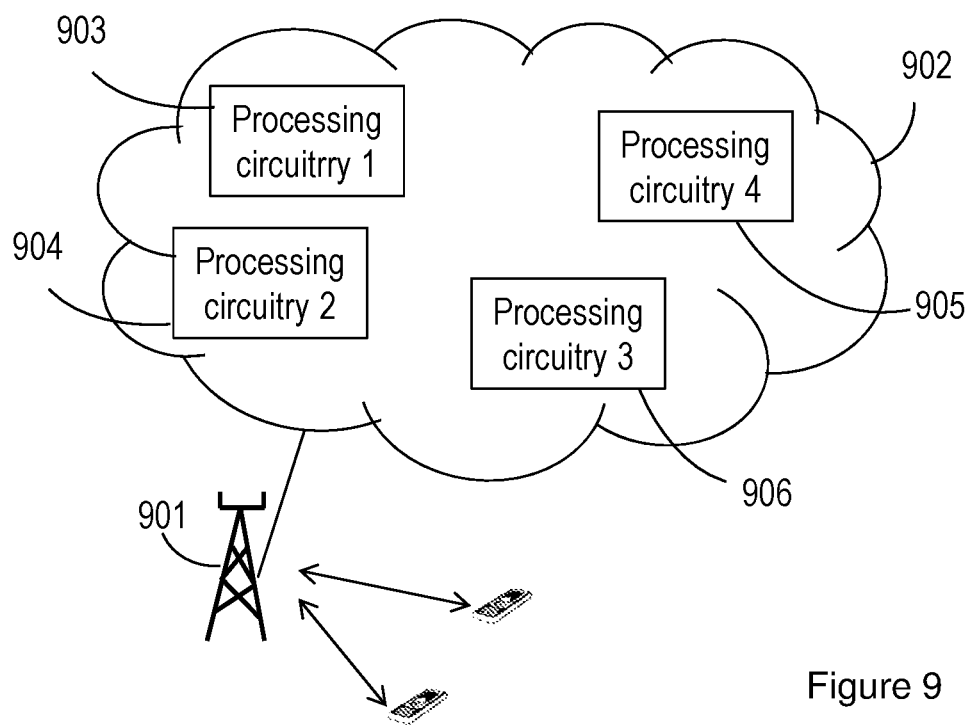

FIG. 8 illustrates an exemplifying wireless communication network, in this case an LTE network, in which the herein suggested solution may be implemented and applied. Wireless communication networks are often described in terms of a Radio Access Network, RAN 805, and a Core network 806. In LTE these are denoted E-UTRAN and EPC. The E-UTRAN 805 comprises radio access nodes 801, which are denoted eNBs. The EPC 806 comprises core network nodes such as MME 802, S-GW 803 and P-GW

804. The solution described herein could be implemented in one or more nodes in a network. For example, in the exemplifying network illustrated in FIG. 8, the functionality for performing the network part of the solution described herein could be implemented in the radio access node 801, which would then configure a wireless device with a first and a second set of resources in which the wireless device may request communication resources from the network. Alternatively, the functionality could be implemented in a core network node, such as the MME 802 or some other control node. In that case, the core network node would configure the wireless device and inform the RAN node 801 of the first and second set of resources, and e.g. induce the RAN node 801 to provide information based on which the first and second set of resources could be determined. The functionality could alternatively be implemented in more than one node, e.g. such that the configuration of the wireless device is performed by the MME 802; and the determining of which resources that should be comprised in the first and second set is performed by the eNB 801.

FIG. 9 also illustrates an exemplifying wireless communication network, in which the herein suggested solution may be implemented. FIG. 9 intends to illustrate a so-called cloud solution, where resources e.g. in form of cloud entities comprising processing capacity or processing circuitry 803-806, in different locations may be used for implementing a certain functionality. The resources need not necessarily be located close to the antenna or access node 901, but may be located e.g. in another region or country. Such resources may be owned by the network provider or operator, or may be provided or rented from a third party. In this type of solution, the functionality associated with a radio access node, e.g. such as the node 801 in FIG. 8, could be implemented in one or more servers or entities located in different geographic positions. In regard of the solution described herein, the functionality for determining the first and the second set of resources could be implemented in cloud entity 903. Alternatively it could be implemented as a cooperation between cloud entities 904 and 905, while other features could be implemented in cloud entity 906. This is an example of a distributed solution.

The steps, functions, procedures, modules, units and/or blocks described herein may be implemented in hardware using any conventional technology, such as discrete circuit or integrated circuit technology, including both general-purpose electronic circuitry and application-specific circuitry.

Particular examples include one or more suitably configured digital signal processors and other known electronic circuits, e.g. discrete logic gates interconnected to perform a specialized function, or Application Specific Integrated Circuits (ASICs).

Alternatively, at least some of the steps, functions, procedures, modules, units and/or blocks described above may be implemented in software such as a computer program for execution by suitable processing circuitry including one or more processing units. The software could be carried by a carrier, such as an electronic signal, an optical signal, a radio signal, or a computer readable storage medium before and/or during the use of the computer program e.g. in one or more nodes of the wireless communication network. The processing circuitry described above may be implemented in a so-called cloud solution, referring to that the implementation may be distributed, and may be referred to e.g. as being located in a so-called virtual node or a virtual machine.

The flow diagram or diagrams presented herein may be regarded as a computer flow diagram or diagrams, when performed by one or more processors. A corresponding arrangement or apparatus may be defined as a group of function modules, where each step performed by a processor corresponds to a function module. In this case, the function modules are implemented as one or more computer programs running on one or more processors.

Examples of processing circuitry includes, but is not limited to, one or more microprocessors, one or more Digital Signal Processors, DSPs, one or more Central Processing Units, CPUs, and/or any suitable programmable logic circuitry such as one or more Field Programmable Gate Arrays, FPGAs, or one or more Programmable Logic Controllers, PLCs. That is, the units or modules in the arrangements in the communication network described above could be implemented by a combination of analog and digital circuits in one or more locations, and/or one or more processors configured with software and/or firmware, e.g. stored in a memory. One or more of these processors, as well as the other digital hardware, may be included in a single application-specific integrated circuitry, ASIC, or several processors and various digital hardware may be distributed among several separate components, whether individually packaged or assembled into a system-on-a-chip, SoC.

It should also be understood that it may be possible to re-use the general processing capabilities of any conventional device or unit in which the proposed technology is implemented. It may also be possible to re-use existing software, e.g. by reprogramming of the existing software or by adding new software components.

The embodiments described above are merely given as examples, and it should be understood that the proposed technology is not limited thereto. It will be understood by those skilled in the art that various modifications, combinations and changes may be made to the embodiments without departing from the present scope. In particular, different part solutions in the different embodiments can be combined in other configurations, where technically possible.

When using the word "comprise" or "comprising" it shall be interpreted as non-limiting, i.e. meaning "consist at least of".

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts.

It is to be understood that the choice of interacting units, as well as the naming of the units within this disclosure are only for exemplifying purpose, and nodes suitable to execute any of the methods described above may be configured in a plurality of alternative ways in order to be able to execute the suggested procedure actions.

It should also be noted that the units described in this disclosure are to be regarded as logical entities and not with necessity as separate physical entities.

The invention claimed is:

1. A method performed by a wireless device in a communication network, the method comprising:

obtaining a configuration related to a first set and a second set of resources which the wireless device may use for requesting communication resources from the communication network, wherein the first set of resources are dedicated resources, in which the communication network will listen for requests, and the second set of resources are non-dedicated resources, in which the communication network only listens for requests when the communication network is not occupied with tasks preventing the communication network from listening;

conducting a first request for communication resources for uplink or downlink communication using one or more first available resources from one of the first set and the second set of resources; and after the first request is conducted and before a reply from the communication network to the first request is received, in response to an additional resource from the other one of the first set and the second set of resources being available, conducting a second request for the communication resources for uplink or downlink communication using the additional resource from the other one of the first set and the second set of resources.

2. The method according to claim 1, wherein requests made in resources comprised in the second set of resources are associated with a lower probability of being received by the communication network than requests made in resources comprised in the first set of resources.

3. The method of claim 1, further comprising:
repeating conducting an extra one or more requests for the communication resources for uplink or downlink communication using resources from the other one of the first set and the second set of resources until a reply is received or a fallback scheme is triggered.

4. The method according to claim 3, wherein a criterion for triggering the fallback scheme relates to at least one of a set of criteria comprising:
a number of allowed unsuccessful attempts to request the communication resources using resources comprised in one of the first set and the second set of resources;
a combination of a number of allowed unsuccessful attempts to request the communication resources using resources comprised in the first set of resources and a number of allowed unsuccessful attempts to request the communication resources using resources comprised in the second set of resources; and
a time period from a first unsuccessful attempt to request the communication resources using the resources comprised in one of the first set and the second set of resources.

5. The method according to claim 4, wherein the second set of resources is associated with a higher number of allowed unsuccessful attempts to request the communication resources than the first set of resources.

6. The method according to claim 4, wherein at least two criteria in the set of criteria are associated with different fallback schemes.

7. The method according to claim 4, wherein one criterion in the set of criteria is related to a combined use of the resources from the first and second set of resources.

8. The method according to claim 1, wherein each of conducting the first request for the communication resources and conducting the second request for the communication resources comprises transmitting a scheduling request or a random access request.

9. The method of claim 1, wherein:
a resource being available comprises a time slot of such resource occurring.

10. A method performed by a network node in a communication network, the method comprising:
configuring a wireless device to use a first available resource from one of a first set and a second set of resources to request uplink or downlink communication resources from the communication network, wherein:
the first set of resources are dedicated resources, in which the communication network will listen for requests, and the second set of resources are non-dedicated resources, in which the communication network only listens for requests when the communication network is not occupied with tasks preventing the communication network from listening;
configuring the wireless device at least comprises informing the wireless device of one or more criteria for when to use the dedicated resources comprised in the first set of resources and the non-dedicated resources comprised in the second set of resources for requesting communication resources; and
the requests made in the non-dedicated resources comprised in the second set of resources are associated with a lower probability of being received by the communication network than the requests made in the dedicated resources comprised in the first set of resources.

11. The method according to claim 10, further comprising:
determining which resources, out of a number of resources, are to be comprised in the respective first set and second set of resources.

12. The method according to claim 11 wherein the determining is based on information related to one or more of:
interference characteristics of the number of resources;
a configuration of the number of resources in terms of dynamic time division duplex, TDD;
transmissions on a backhaul link; and
use of corresponding resources in a neighbor network node.

13. The method according to claim 10, wherein configuring the wireless device comprises indicating the first set and the second set of resources to the wireless device.

14. A wireless device operable in a communication network, the wireless device being configured to
obtain a configuration related to a first set and a second set of resources, which the wireless device may use for requesting communication resources from the communication network, wherein the first set of resources are dedicated resources, in which the communication network will listen for requests, and the second set of resources are non-dedicated resources, in which the communication network only listens for requests when the communication network is not occupied with tasks preventing the communication network from listening;
conduct a first request for communication resources for uplink or downlink communication using one or more first available resources from one of the first set and the second set of resources; and
after the first request is conducted and before a reply from the communication network to the first request is received, in response to an additional resource from the other one of the first set and the second set of resources being available, conduct a second request for the communications resources for uplink or downlink communications using the additional resource from the other one of the first set and the second set of resources.

15. The wireless device of claim 14, further configured to:
repeat conducting an extra one or more the requests for the communication resources for uplink or downlink communication using resources from the other one of the first set and the second set of resources until a reply is received or a fallback scheme is triggered.

16. The wireless device according to claim 15, wherein a criterion for triggering the fallback scheme relates to at least one of a set of criteria comprising:
a number of allowed unsuccessful attempts to request the communication resources using resources comprised in one of the first set and the second set of resources;
a combination of a number of allowed unsuccessful attempts to request the communication resources using resources comprised in the first set of resources and a number of allowed unsuccessful attempts to request the communication resources using resources comprised in the second set of resources; and
a time period from a first unsuccessful attempt to request the communication resources using the resources comprised in one of the first set and the second set of resources.

17. The wireless device according to claim 16, wherein the second set of resources is associated with a higher number of allowed unsuccessful attempts to request the communication resources than the first set of resources.

18. The wireless device of claim 14, wherein:
a first available resources comprises a resource available in a first occurring slot.

19. A network node, operable in a wireless communication network, the network node being configured to:
configure a wireless device to use a first available resource from one of a first set and a second set of resources to request uplink or downlink communication resources from the wireless communication network, wherein:
the first set of resources are dedicated resources, in which the communication network will listen for requests, and the second set of resources are non-dedicated resources, in which the communication network only listens for requests when the communication network is not occupied with tasks preventing the communication network from listening;
configuring the wireless device at least comprises informing the wireless device of one or more criteria for when to use the dedicated resources comprised in the first set of resources and the non-dedicated resources comprised in the second set of resources for requesting communication resources; and
the requests made in the non-dedicated resources comprised in the second set of resources are associated with a lower probability of being received by the wireless communication network than the requests made in the dedicated resources comprised in the first set of resources.

20. The network node according to claim 19, being further configured to:
determine which resources, out of a number of resources, are to be comprised in the respective first set and the second set of resources.

21. The network node according to claim 20, wherein the determining is based on information related to one or more of:
interference characteristics of the number of resources;
a configuration of the number of resources in terms of dynamic time division duplex, TDD;
transmissions on a backhaul link; and
use of corresponding resources in a neighbor network node.

22. The network node according to claim 19, wherein configuring the wireless device comprises indicating the first set and the second set of resources to the wireless device.

* * * * *